United States Patent [19]

Warren, Jr. et al.

[11] 3,736,377

[45] May 29, 1973

[54] MULTIPLE CHANNEL VIDEO SWITCHING SYSTEM

[76] Inventors: Robert H. Warren, Jr., 2102 E. Broadway Apt. 34, Mesa, Ariz. 85204

[22] Filed: May 10, 1971

[21] Appl. No.: 141,559

[52] U.S. Cl................178/7.2, 178/6.8, 178/DIG. 6

[51] Int. Cl................H04n 5/22

[58] Field of Search...............178/6, 6.8, 7.1, 178/7.2, DIG. 6

[56] References Cited

UNITED STATES PATENTS 2,172,936 9/1939 Goldsmith...............178/DIG. 6

*Primary Examiner*—Robert L. Richardson
*Attorney*—Harry A. Herbert, Jr. and Julian L. Siegel

[57] ABSTRACT composite display system for a plurality of television cameras in which one camera develops synchronizing signals and video waveform switching signals for the other cameras using delays from one-shot multivibrator circuits. The video switching is performed by a circuit having dual gate insulated insulated effect transistors with one gate of each being fed by a switching waveform signal and the other gate by the video signal from the corresponding camera.

3 Claims, 7 Drawing Figures

INVENTOR
ROBERT H. WARREN JR.
BY Harry A. Herbert Jr.
and Julian L. Siegel
ATTORNEYS INVENTOR
ROBERT H. WARREN JR.
BY Harry A. Herbert Jr.
Julian L. Siegel and
ATTORNEYS INVENTOR
ROBERT H. WARREN Jr.
BY Harry A. Herbert Jr.
Julian L. Siegel and
ATTORNEYS INVENTOR
ROBERT H. WARNER Jr.
BY Harry A. Herbert Jr
Julian L. Siegel and
ATTORNEYS

MULTIPLE CHANNEL VIDEO SWITCHING SYSTEM

BACKGROUND OF THE INVENTION

This invention relates to simultaneous viewing of a plurality of television cameras on a single monitor and more particularly to a multiple channel video switching circuit.

Viewing more than one TV camera on a single monitor has been used in the past, but the present invention offers a novel and improved system in which one camera is the basic timing source and develops the drive signals for the other cameras.

SUMMARY OF THE INVENTION

The system of the present invention uses a basic buffer circuit to the horizontal and vertical drive waveforms of one of the television cameras with the waveforms being applied to the one-shot multivibrator circuits which form the drive signals and the switching waveforms for the other camera systems. The switching waveforms are fed to a series of dual insulated gate field effect transistors together with the video inputs of each of the cameras. The video gating is performed by these field effect transistors and a composite display is formed.

It is an object of this invention to provide a novel television display system.

It is another object to provide a television system for displaying a composite picture from a plurality of cameras.

It is still another object to provide a television system for simultaneously displaying partial outputs of a plurality of cameras in which one camera develops the drive signals for the others.

These and other advantages, features and objects of the invention will become more apparent from the following description taken in connection with the illustrative embodiment in the accompanying drawings.

DETAILED DESCRIPTION OF THE PREFERRED EMBODIMENT

The invention is explained showing the formation of a single composite display originating from three television cameras. However, it is understood that any number of cameras could be used with various display arrangements which remain within the scope of the invention.

Figure 1:
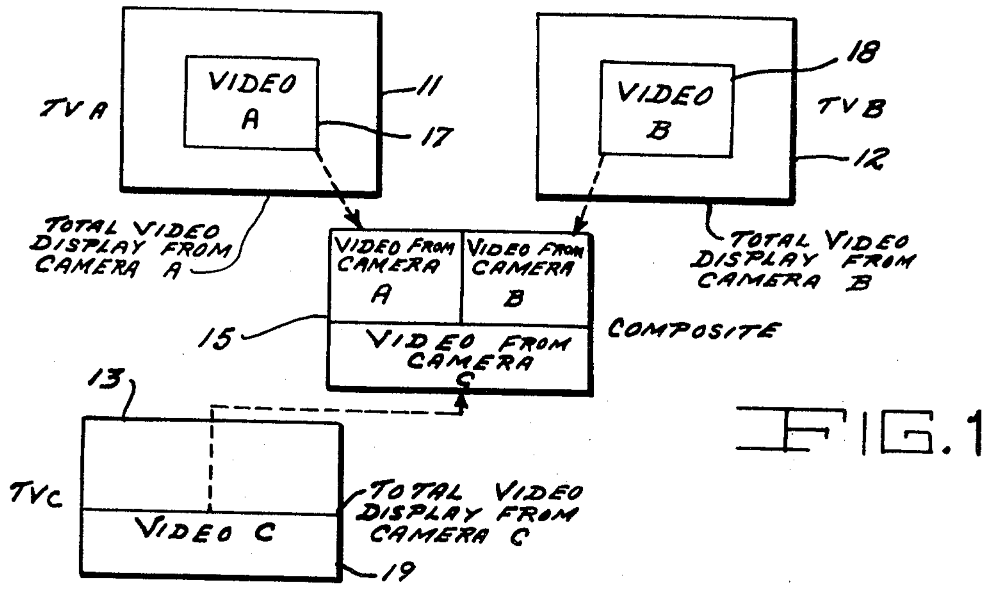
FIG. 1 is a diagram showing the composite display for a three-channel video switching circuit.

Referring to FIG. 1, there is shown three television displays 11–13 labeled TV-A, TV-B, and TV-C, which represent three television screens. It is desired to take parts of each screen and display them simultaneously on composite screen 15. Area 17, labeled "Video A," is the area which contains information to be displayed while the white border is nonessential and will not be shown in the final television display. The other two areas 18 and 19 are also of interest, and the object is to display the three center areas on a single television screen. This is achieved by electronic switching (or gating) and timing. Each camera which produces a display for its respective television screen begins its electron sweep at a certain moment in time such that the area of interest 17–19 is being swept at its corresponding display time. At the proper time the video signal is received from A and is displayed (single line) as the monitor begins to sweep. About halfway across the screen the A video is turned off and simultaneously the B video is turned on. About halfway down the screen the C video is turned on and remains on for the remainder of the composite display. The entire procedure is then repeated. The A television screen begins its electron sweep before C television screen begins its electron sweep. This is done with the horizontal drive signal for A beginning 15 microseconds (¼ frame) before the C horizontal drive begins. In this manner area 17 of television A can be displayed in the upper left corner of composite 15. The same is true of the B video except that its sweep begins ¼ sweep after the C sweep begins. The desired portion is then in proper time for the display and the same is true for the vertical.

Figures 2, 7:
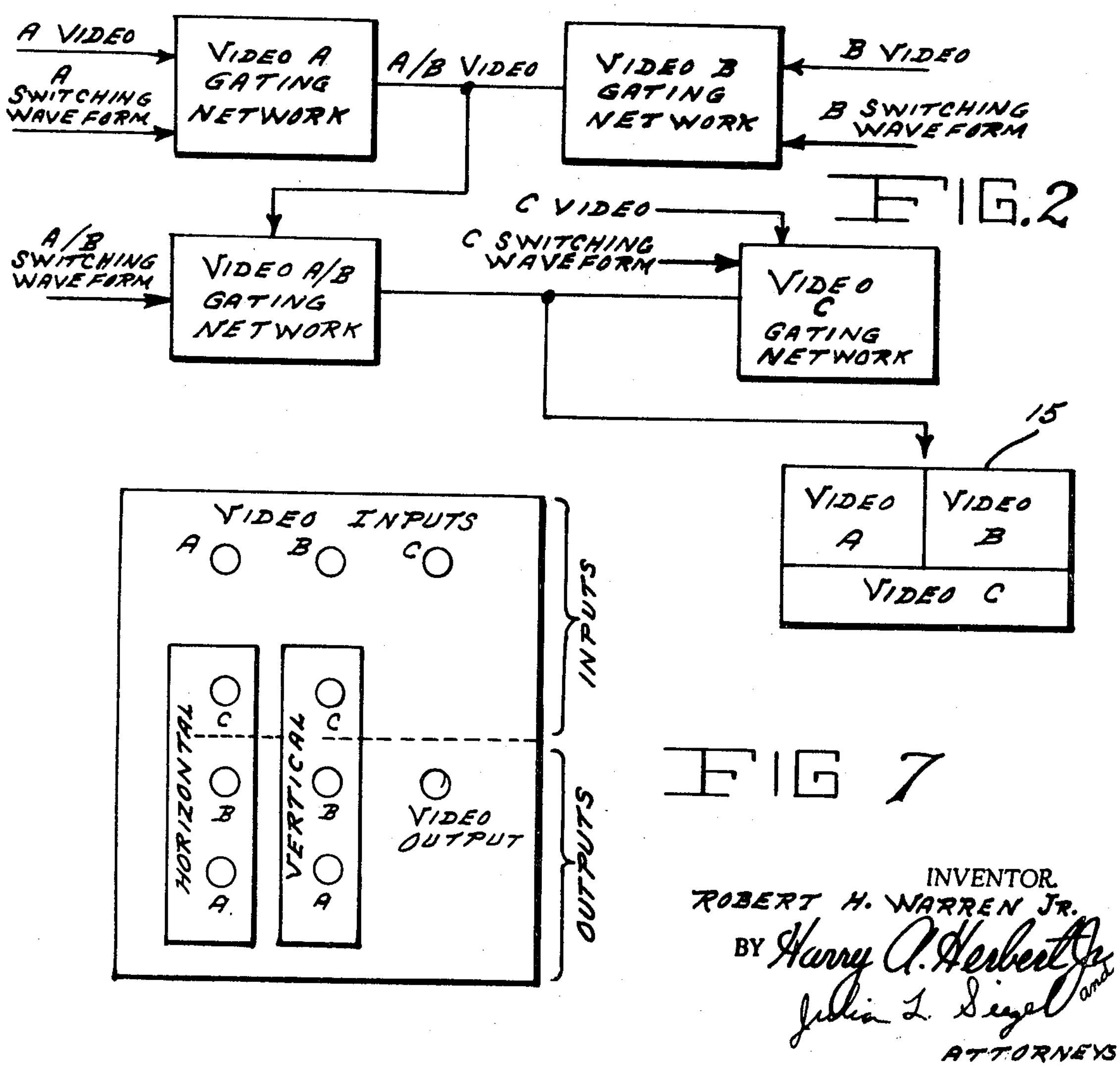
FIG. 2 is a video switching block diagram for the three-channel video switching circuit.
FIG. 7 is the input-output layout of the invention.

FIG. 2 shows in block diagram form the control of the video signals for the three channels. The gating networks receive switching waveforms that correspond to the desired displays from the three cameras A, B, and C to form the composite. Also fed to the gating network are the three video signals which result in composite display 15.

Figure 3:
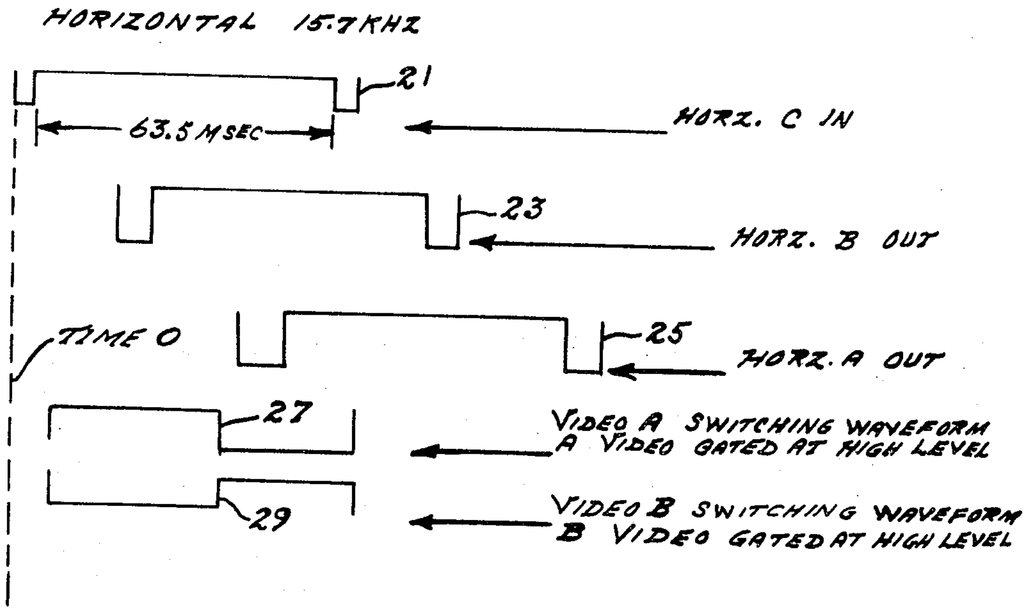
FIGS. 3 and 4 show timing waveforms useful in the explanation of the invention.

The horizontal waveforms are shown in FIG. 3 where the basic horizontal frequency is 15.7 KHz and is derived from horizontal C waveform 21 which, through the circuitry to be explained subsequently, produces the horizontal B and A pulses 23 and 25. The video A and B switching waveforms 27 and 29 are shown where the high level is "on."

Figure 4:
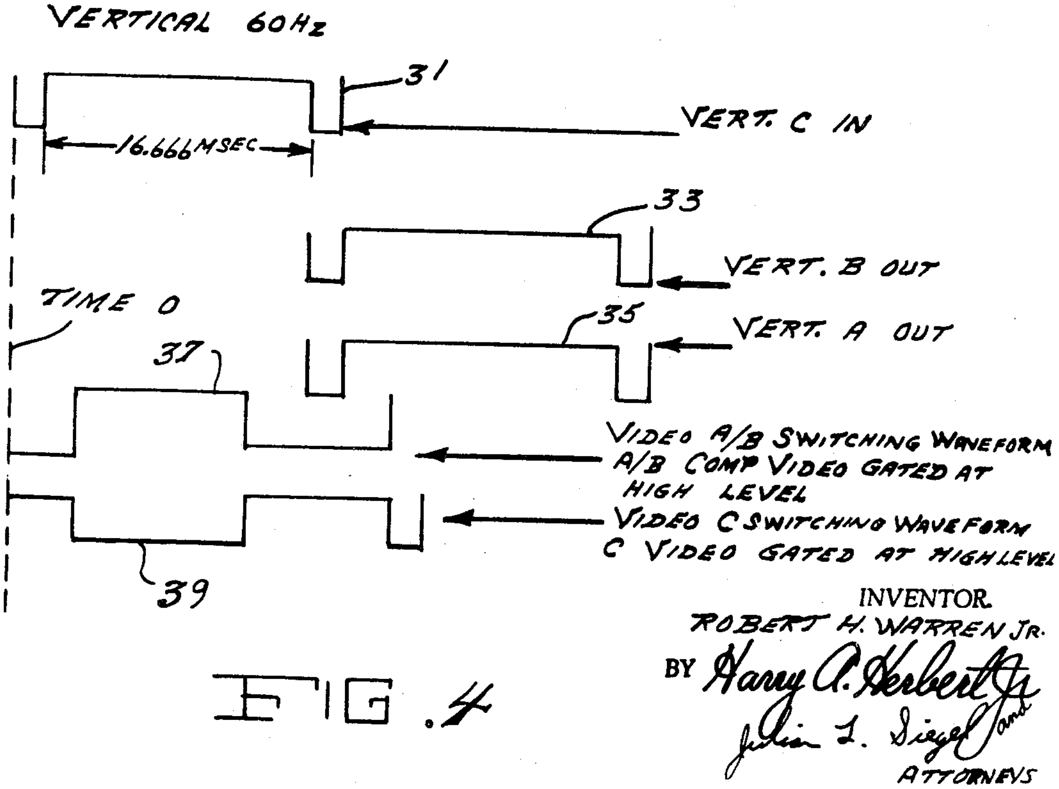

In FIG. 4, the vertical waveforms are shown where the basic pulse is derived from vertical C waveform 31 which produces vertical B and A waveforms 33 and 35. Video A/B switching waveforms 37 and video C waveforms 39 are are gated at the high level.

Figure 5:
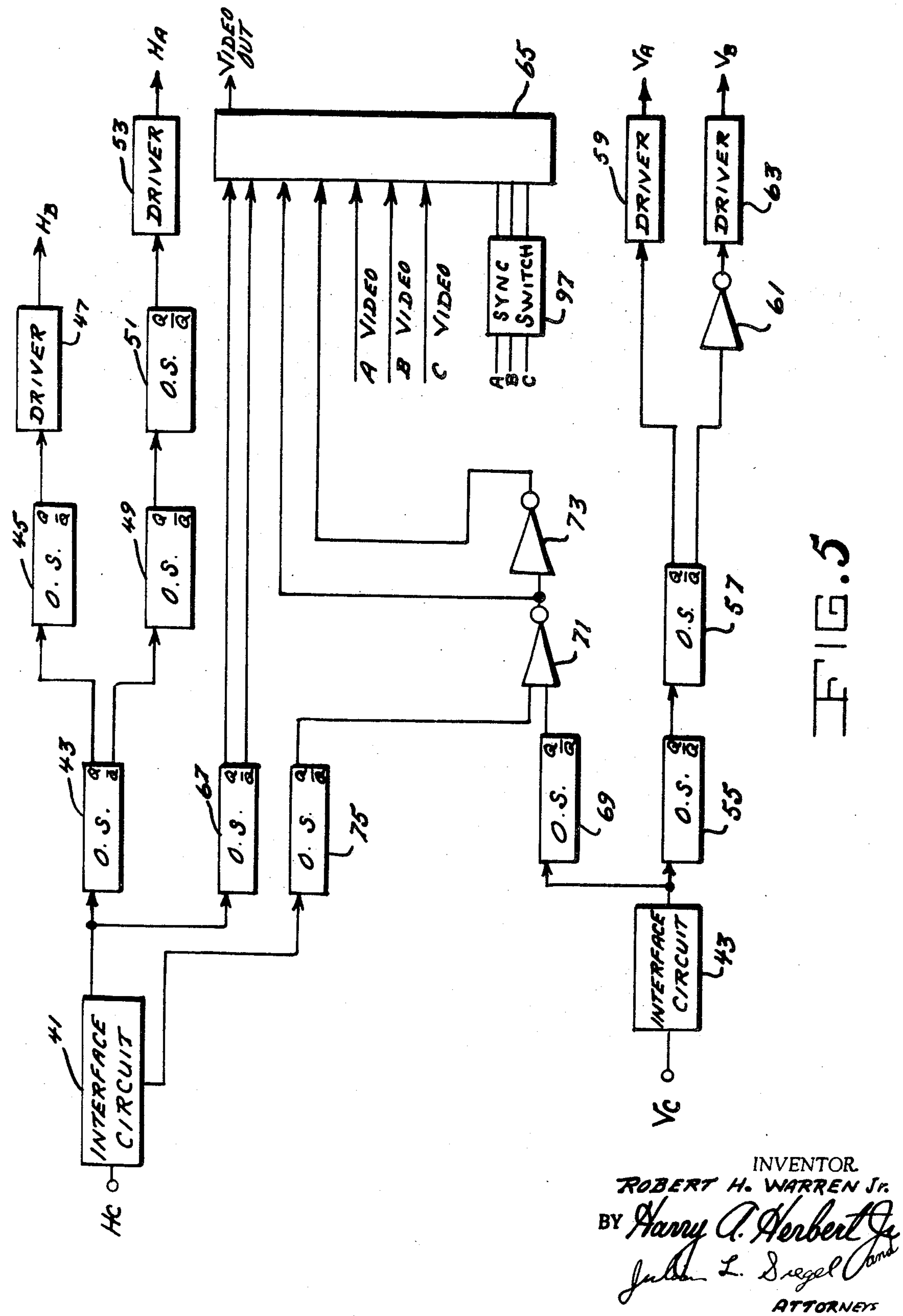
FIG. 5 is a circuit block diagram of the embodiment of the invention.

An embodiment of the invention is shown in FIG. 5 where interface circuits 41 and 43 are used for isolation. The horizontal C input is fed to interface circuit 41 and than to one-shot multivibrator 43, one shot multivibrator 45, and driver circuit 47, producing the horizontal B output which represents a ¼ delay. A second output from one-shot multivibrator 43 is fed to one-shot multivibrators 49 and 51 and driver circuit 53 producing horizontal A which is a ¾ delay. Interface circuit 43 feeds one-shot multivibrator 55 and then the one-shot multivibrator 47 to produce vertical A through driver circuit 59. A second output of one-shot multivibrator 57 is fed to amplifier-inverter 61 and then to driver 63 to produce vertical B. This technique is used for isolation to prevent feedback or cross talk problems.

The horizontal and vertical waveforms that are fed to switching circuit 65 are produced also by a combination of one-shot multivibrators and inverter-amplifiers. One-shot multivibrator 67 which is fed by interface circuit 41 has two outputs that produce the horizontal waveforms. One-shot multivibrator 69, fed by interface circuit 43, is then fed to inverter-amplifier 71 which feeds inverter-amplifier 73. The outputs from these inverter-amplifiers constitute the vertical switching waveforms. An input to inverter-amplifier 71 from interface circuit 41 via one-shot multivibrator 75 introduces the vertical blanking signal into the switching waveform and hence syncs on the video output. The video signals from cameras A, B and C are also fed to video switching circuit 65.

Figure 6:
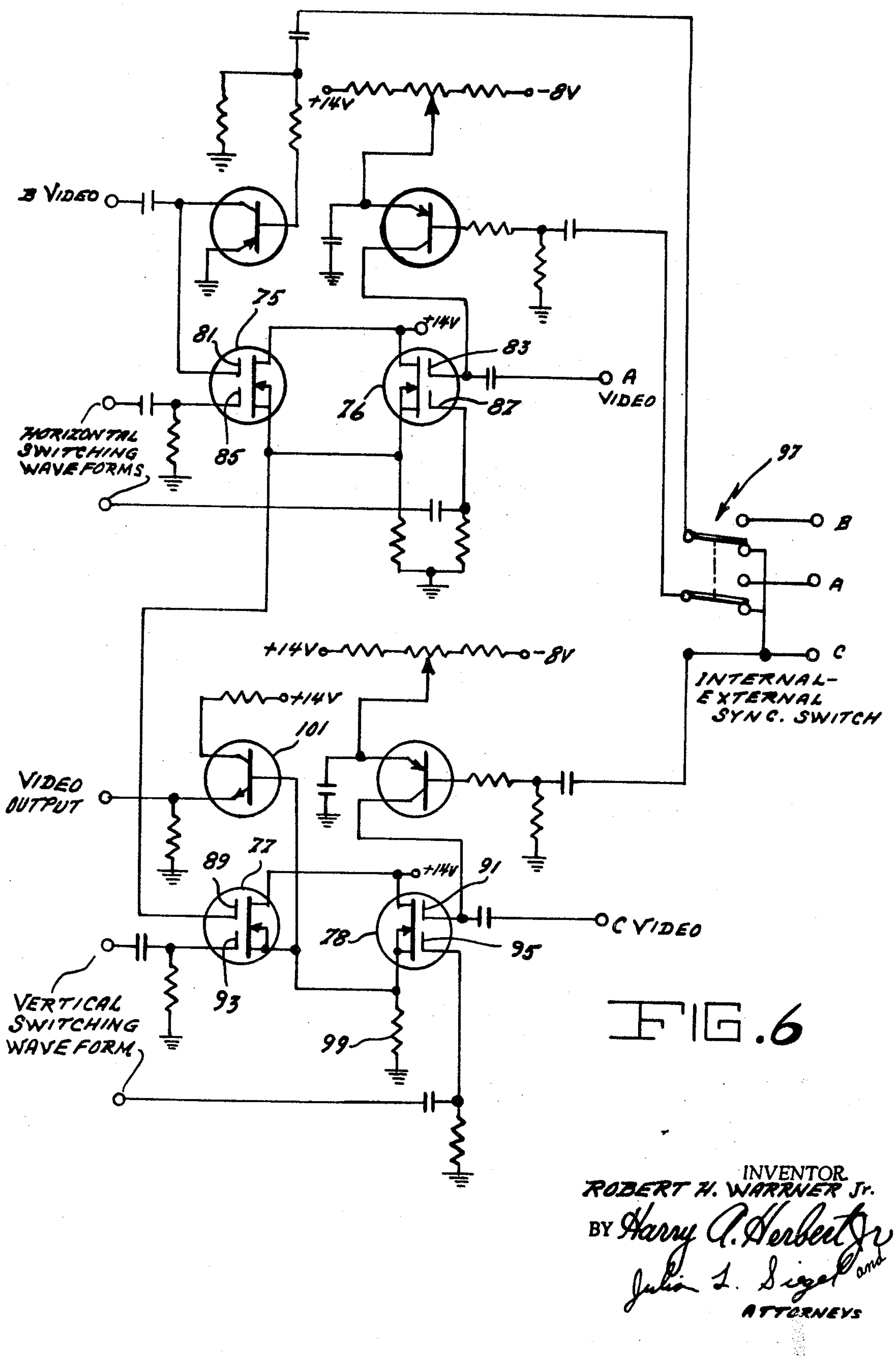
FIG. 6 is a circuit diagram of the video waveform switching circuit included in FIG. 5.

FIG. 6 shows the details of video switching circuit 65 of FIG. 5. The circuit employs four dual insulated gate field effect transistors 75–78 to switch the input video signals. The video from camera A (labeled A video) is applied to gate 83 of transistor 76 and B video is applied to gate 85 of transistor 75, and the horizontal switching signals are applied to gates 85 and 87. A composite video signal is then formed, video A being on the left and video B being on the right, with a division down the center. Transistors 77 and 78 split the screen horizontally and add video C on the bottom. In this case video C is applied at gate 91 and vertical switching signals are applied at gates 93 and 95 of transistors 77 and 78.

Ganged switch 97 is the internal-external synchronizing switch. Cameras A and B should be of the type to operate on an external drive.

The video output comes from the common emitter resistor 99 through transistor 101.

FIG. 7 shows the layout for the input-output panel using connectors such as the BNC type.

What is claimed is:

1. A composite television display system comprising:

a. a first television camera having an output of synchronizing signals and a video signal output;

b. a second television camera having a video signal output;

c. means for generating synchronizing signals corresponding to the composite display portion of the second television camera and fed to the second television camera, the synchronizing signal generating means being fed by the synchronizing output of the first television camera;

d. means for generating a plurality of video switching waveforms corresponding to the composite display, the switching waveform generating means being fed by the synchronizing output of the first television camera; and e. a video switching circuit fed by the video signals of the first and second television and the switching waveforms.

2. A composite television display system according to claim 1 where the means for generating synchronizing signals and the means for generating switching waveforms are one-shot multivibrator circuits.

3. A composite television display system according to claim 2 wherein the video switching circuit includes a plurality of dual gate field effect transistors with one gate of each transistor being fed by the waveform generator means and the other gate being fed by a corresponding video signal.

* * * * *